United States Patent [19]

Donahue et al.

[11] Patent Number: 4,882,244

[45] Date of Patent: Nov. 21, 1989

[54] BATTERY CONTAINING A METAL ANODE AND AN ELECTROLYTE PROVIDING HIGH RATES OF METAL ELECTROLYSIS AT NEAR AMBIENT TEMPERATURES

[75] Inventors: Francis M. Donahue; Leif R. Simonsen; Russell L. Moy, all of Ann Arbor, Mich.

[73] Assignee: The University of Michigan-Ann Arbor, Ann Arbor, Mich.

[21] Appl. No.: 33,208

[22] Filed: Apr. 2, 1987

[51] Int. Cl.$^4$ .................... H01M 6/14; H01M 6/16
[52] U.S. Cl. .................... 429/194; 429/198; 429/199
[58] Field of Search ............... 429/194, 198, 199, 213

[56] References Cited

U.S. PATENT DOCUMENTS

| | | |
|---|---|---|
| 3,098,770 | 7/1963 | Horowitz et al. |
| 4,104,450 | 8/1978 | Whitney et al. ............... 429/198 X |
| 4,122,245 | 10/1978 | Nardi et al. ............... 429/198 X |
| 4,142,028 | 2/1979 | Leger et al. ............... 429/194 |
| 4,463,071 | 7/1984 | Gifford et al. ............... 429/199 |
| 4,463,072 | 7/1984 | Gifford et al. ............... 429/194 |

OTHER PUBLICATIONS

FJSRL-TR-82-0006, (Jul. 1982), "Densities, Electrical Conductivities, Viscosities and Phase Equilibria of 1,3--dialkylimidazolium chloride . . . ," Fannin et al.
Adv. Molten Salt Chem., (1985), 5, pp. 185-230, "Room Temperature Molten Salt Systems", Charles L. Hussey.

*Primary Examiner*—Stephen J. Kalafut
*Attorney, Agent, or Firm*—Oblon, Spivak, McClelland, Maier & Neustadt

[57] ABSTRACT

A high rate, high energy density electrochemical cell utilizing a metal anode is disclosed. This electrochemical cell contains an acidic electrolyte which comprises a cation component, a Lewis acid, and a nitrile compound.

16 Claims, 1 Drawing Sheet

BATTERY CONTAINING A METAL ANODE AND AN ELECTROLYTE PROVIDING HIGH RATES OF METAL ELECTROLYSIS AT NEAR AMBIENT TEMPERATURES

This invention was made with U.S. government support under Contract 85-0027 awarded by the Air Force Office of Science Research. The U.S. government has certain rights in this invention.

BACKGROUND OF THE INVENTION

1. Field of the Invention

The present invention relates to batteries containing metal anodes.

2. Discussion of the Background

Battery manufacturers and users of portable electronic equipment are continuously searching for new high rate, high energy density nonaqueous[1] electrochemical conversion devices that are operable at or near room temperature. In many specialized applications, such as satellites or space vehicles, these devices should also be useful at low temperatures, for example at temperatures of 20° C. below zero.

[1] Aqueous electrolytes are incompatible with energetic anode materials and do not function at very low temperatures. Thus they are essentially not used.

Devices that possess these attributes would find use in electronic equipment for space, military, communication and medical applications. Of course, any such device should preferably be inexpensive and facile to manufacture, easily handled, and safe when used.

High rate, high energy density electrochemical cells utilize nonaqueous electrolytes because of their compatibility with energetic metal anodes. The most energetic metal, based on gravimetric coulombic capacity, is aluminum. Unfortunately, available electrolytes that support aluminum electrolysis require elevated temperatures or promote deleterious electrode passivation. Thus, commercially lithium anodes and liquid electrolytes such as thionyl chloride or sulfur dioxide are used.

Unfortunately, lithium metal is much more reactive than aluminum metal, making its handling difficult. The reactivity of lithium metal can result in production problems if proper and expensive precautions are not taken. Lithium anode-based batteries also suffer from other problems. Sulfur dioxide is a volatile material having a boiling point of −10° C. which contributes to handling difficulties and potential safety problems. Lithium-thionyl chloride batteries have been plagued with safety problems that occur when the cells are discharged at high rates. When the cells are short circuited or discharged at high rates, substantial pressures can build up in the cell due to internal heating.

There is therefore a strongly felt need for an alternative nonaqueous electrode/electrolyte combination capable of sustaining high discharge rates and which would not suffer from the above problems.

SUMMARY OF THE INVENTION

Accordingly, it is one object of this invention to provide an electrolyte that will support high rate metal electrolysis.

It is another object of this invention to provide an electrolyte that will support high rate metal electrolysis at temperatures near ambient temperature.

It is another object of this invention to provide an electrolyte that will support high rate metal electrolysis without deleterious electrode passivation.

It is another object of this invention to provide a novel inexpensive battery.

It is another object of this invention to provide a novel battery which is easily handled.

It is another object of this invention to provide a novel battery which is safe to use.

It is another object of this invention to provide a novel battery which is easily and safely manufactured.

The inventors have now surprisingly discovered a novel electrode/electrolyte combination which provides a battery that satisfies all of the above objects of this invention and other objects which will become apparent from the description of the invention given hereinbelow. This novel electrode/electrolyte combination comprises, as the electrode, a metal anode. The electrolyte is a combination of a cation component, a Lewis acid, and a nitrile component. The inventors have discovered that using this nitrile component in combination with an acidic mixture of the cation component and the Lewis acid provides surprisingly high metal rates of electrolysis and eliminates anode passivation.

This electrode/electrolyte combination is suitable for use in high rate primary, secondary, or reserve electrochemical cells.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying figures, wherein.

DETAILED DESCRIPTION OF THE PREFERRED EMBODIMENTS

Figure 1A:
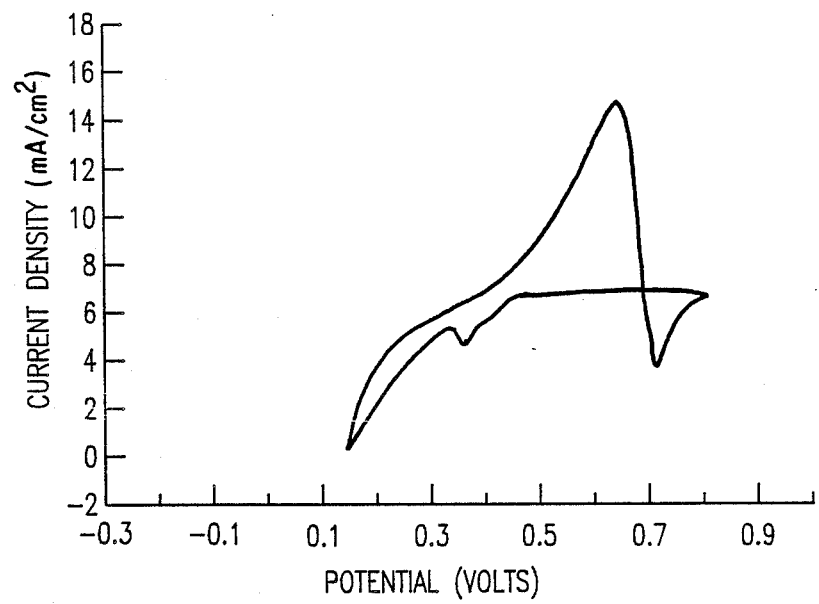
FIG. 1A illustrates aluminum anodic behavior in an aluminum trichloride/1-methyl-3-ethylimidazolium chloride electrolyte containing no nitrile component.

Some patent literature has generically discussed the possible presence of nitrile components in electrolytes. See for example, U.S. Pat. Nos. 4,463,072; 4,463,071; 4,142,028; and 3,098,770. None of these disclosures however suggest that nitrile components can be advantageously used in acidic electrolytes.

As discussed above, the inventors of this invention use an acidic mixture of cation component and Lewis acid. This mixture of cationic component and Lewis acid is acidic when a molar excess of Lewis acid is used relative to cationic component, vide infra.

The terms "anode" and "cathode" are used in this document in accordance with standard practice. In secondary batteries, the term "anode" is used to refer to the negative electrode and the term "cathode" is used to refer to the positive electrode. In primary and reserve cells the terms "anode" and "cathode" are used.

The batteries of the present invention comprise a metal anode. The anode can be made of aluminum, zinc, magnesium, calcium, sodium, potassium, gallium, antimony, lead, alloys of any combination of these metals, including amalgams. Most of these metals are not as chemically reactive as lithium, making the handling of these cell components less difficult than a corresponding lithium battery. Additionally aluminum which can be advantageously used is more energetic than lithium (on a gravimetric coulombic basis).

Suitable metallic anodes used in the present invention can have different shapes which include rods, foils, powders, shot, pellets or sheets of aluminum, zinc, magnesium, calcium, sodium, potassium, gallium, antimony, lead, alloys of any of these metals, including amalgams. The metallic anode can be attached to (e.g., plated or pressed onto) a suitable current collectors such as for example, nickel, tungsten, or carbon foil, expanded metal screen or fibrous mat. Such anodes are readily prepared using techniques well known in this art.

Suitable aluminum anodes which can be used advantageously in this invention include aluminum rods, foils, powders, shot, pellets or sheets, or aluminum which may be attached to (e.g. plated or pressed onto) a suitable current collector such as for example nickel, tungsten, or carbon foil, expanded metal screen or fibrous mat. The aluminum used in the anode may be aluminum, an aluminum amalgam, or an aluminum alloy.

The electrolyte used in the present invention comprises a cation component, a Lewis acid and a nitrile component. The cation component can be an inorganic material such as LiCl, NaCl or KCl, or it can be an organic material. Examples of organic cation components include 1,3-dialkylimidazolium cations, halide derivatives of these 1,3-dialkylimidazolium cations, 1,2,3-trialkylimidazolium cations, halide derivatives of these 1,2,3-trialkylimidazdium cations, N-alkyl pyridinium cations, alkylated derivatives of these N-alkyl pyridinium cations, tetraalkyl ammonium cations, halide derivatives of these tetraalkyl ammonium cations, or mixture of any of these.

Typically, the alkyl groups in these organic cations can independently contain from 1 to 6 carbon atoms. The counter ions of these organic cations can be a chloride anion, a bromide anion, an iodide anion, $AlCl_4-$, $AlBr_4-$, $AlI_4-$, $SbCl_4-$, $ClO_4-$, $BF_4-$, $PF_6-$, $PCl_6-$, $PCl_4-$, $AsF_6-$, $SbF_6-$, $SbCl_6-$, $BCl_4-$, $GaCl_4-$, $SCN-$, $CF_3SO_3-$ or $AsCl_6-$.

The 1,3-dialkylimidazolium cations which can be used include 1,3-di($C_{1-6}$)alkylimidazolium cations of formula (I),

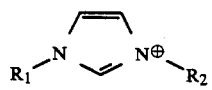
(I)

wherein $R_1$ and $R_2$ are each independently a $C_{1-6}$ linear, branched or cyclic alkyl group. Preferably each group $R_1$ and $R_2$ is independently methyl, ethyl, propyl or butyl. In another preferred embodiment, 1-methyl3-imidazolium chloride is used.

Halide derivatives of the 1,3-dialkyl imidazolium cations which can be used in the electrolyte of present invention include 1,3-di($C_{1-6}$)alkyl imidazolium cations substituted with from 1 to 6 halide atoms. The compounds have the formula (II),

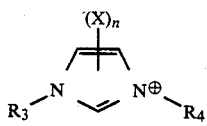
(II)

wherein $R_3$ and $R_4$ are each independently a $C_{1-6}$ linear, branched or cyclic alkyl group, each of which can contain up to six halogen substituents. X is a halide substituents on the imidazole ring, and n is 0–3. Preferably each group $R_3$ and $R_4$ is independently methyl, ethyl, propyl or butyl.

As shown in formula (II), the substitution of the halide atoms can be, independently, on the imidazole ring and/or on either of the alkyl groups. The halide substituents include fluorine, chlorine, bromine, and iodine. Preferably the 4- and 5-position of the imidazole ring are substituted with halide atoms, e.g., chloride atoms.

In a preferred embodiment, the following 1,3-dialkyl imidazolium cation halide derivatives are used: 4,5-dihaloimidazolium compounds of formula (II) in which each group $R_3$ and $R_4$ is independently methyl, ethyl, propyl or butyl.

The 1,2,3-trialkylimidazolium cation which can be used include 1,2,3,-tri($C_{1-6}$)alkylimidazolium cations of the following formula (III),

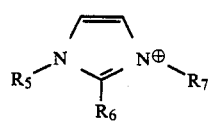
(III)

wherein $R_5$, $R_6$, and $R_7$ are each independently a $C_{1-6}$ linear, branched or cyclic alkyl group. In a preferred embodiment, each group $R_5$, $R_6$ and $R_7$ is independently methyl, ethyl, propyl or butyl. 1,2,3-trimethylimidazolium chloride is particularly preferred.

Halide derivatives of the 1,2,3-trialkylimidazolium cations which can be used in the electrolyte of the present invention include 1,2,3-tri($C_{1-6}$)alkyl imidazolium cation substituted with from 1 to 6 halogen atoms. These compounds have the formula (IV),

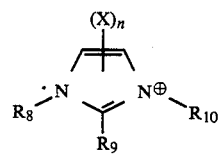
(IV)

wherein $R_8$, $R_9$, and $R_{10}$ are each independently a $C_{1-6}$ linear, branched or cyclic alkyl group, each of which can contain up to 6 halide substituents. X is a halide substituent on the imidazole ring, and m is 0 to 2.

Preferably the 4- and 5-positions of the imidazole ring are substituted with halide atoms, e.g., chloride atoms. Preferred imidazolium ations of formula (IV) include 4,5-dihaloimidazolium compounds of formula (IV) in which each group $R_8$, $R_9$ and $R_{10}$ is independently methyl, ethyl, propyl or butyl.

Typical examples of N-alkyl pyridinium cations which can be used include N-($C_{1-6}$)alkyl pyridinium cations, preferably N-($C_{1-4}$)alkyl pyridinium cations, such as a N-methyl-, a N-ethyl-, a N-propyl- or a N-butyl pyridinium cation.

Alkyl derivatives of the N-alkyl pyridinium cations used in the present invention include N-alkyl pyridinium cations containing from one to six $C_{1-4}$ alkyl substituents. These substituted N-alkyl pyridinium cations can be substituted by $C_{1-4}$ alkyl substituents independently, on either the alkyl portion of the molecule or the pyridine portion of the molecule. They are represented by formula (V),

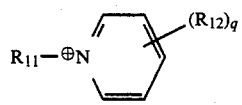

wherein $R_{11}$ is a $C_{1-6}$ linear, branched or cyclic alkyl group which can be substituted with up to a six $C_{1-4}$ alkyl substituents. $R_{12}$ is the $C_{1-4}$ alkyl substituent(s) on the pyridine ring, and q is 0-5.

Typical examples of tetraalkyl ammonium cations which are used include tetra($C_{1-6}$)alkyl ammonium cations. Preferably tetramethyl-, tetraethyl-, tetrapropyl- or tetrabutyl ammonium chloride is used. Of course, mixed tetraalkyl ammonium cations can be used. These include methyl triethyl ammonium cations, dimethyl diethyl ammonium cations, methyl tripropyl ammonium cations, etc.

Halide derivatives of the tetraalkyl ammonium cations can typically contain from 1 to 6 halogen atoms which are independently situated on any of the four, or all four, alkyl substituents of the tetraalkyl ammonium cations. The halogen atoms include fluorine chlorine, bromine and iodine.

The electrolyte of the present invention is characterized by containing at least one of these cation components. Of course, it can contain a mixture of any of these, including mixtures containing inorganic and organic cations.

The Lewis acid which is used in the present invention include aluminum trichloride, aluminum tribromide, aluminum triiodide, magnesium dichloride, calcium dichloride, zinc dichloride, their corresponding mixed halides (e.g., $AlCl_2Br$), or a mixture of these.

The nitrile component used in the present invention is an aliphatic or unsaturated, including aromatic, organic compound substituted by at least one nitrile, —CN, substituent. This nitrile component can contain, in addition to the carbon atoms incorporated in the nitrile substituents, up to 12 carbon atoms. The nitrile component can be a linear, branched or cyclic alkane substituted by at least one nitrile substituent and up to as many nitriles substituents as there are carbon atoms in the structure substituted by the nitrile substituent(s).

Aromatic nitrile components include aromatic structures containing from 6 to 12 carbon atoms which are substituted by from 1 to 12 nitrile substituents. For example, benzonitrile can be used.

The nitrile component also includes aliphatic compounds of the formula $C_aH_b(CN)_d$ wherein a is an integer of from 1 to 12, d is an integer of from 1 to 12, and (b+d) is equal to $2a+2$ or (b+d) is equal to $2a-z$, where z is 0, 2, 4, 6, 8 or 12. For example, the nitrile component may be acetonitrile, propionitrile, or butyronitrile.

The combination of the cation component, the Lewis acid and the nitrile component used in the present invention provides notable advantages. For example, aluminum chloride/1-methyl-3-ethylimidazolium chloride mixtures which are used in a preferred embodiment of the present invention, vide infra, form low vapor pressure ionic liquids and therefore have less danger of pressure build-up than the sulfur-based electrolytes. The low glass transition temperature of the aluminum trichloride/1-methyl-3-ethylimidazolium chloride mixture (as low as $-98°$ C.) and the low freezing point of acetonitrile ($-43.8°$ C.) gives this electrolyte a distinct low temperature advantage over more conventional water-based electrolytes.

The electrolyte preferably contains a molar ratio of Lewis acid to cation component sufficient to make the mixture acidic. That is to say, the mixture of the Lewis acid and the cation component possesses an overall molar excess of Lewis acid.

One point relating to the cation component counter ion should be noted. If one uses a cation component having as counter ion a species which can not dissociate to form a Lewis acid, for example a chloride, bromide or iodine ion, then to obtain an acidic electrolyte mixture a molar amount of Lewis acid greater than the molar amount of cationic component must be used. By contrast, if the cation component counter ion is capable of dissociating into a Lewis acid, for example, if the species $AlCl_4-$ is used, which species is capable of dissociating into $AlCl_3$ (a Lewis acid) and $Cl^-$, then only a small amount of Lewis acid needs to be used because the cationic component counter ion provides already an equimolar quantity of Lewis acid. Thus, the nature of the cationic component caterion must be considered in the preparation of the acidic electrolyte of the present invention.

The electrolyte of the present invention is acidic because the molar quantity of Lewis acid present in the mixture is greater than the molar quantity of the cation component present. Thus, this molar ratio is greater than the one. It can preferably go up to 50, and more preferably up to 10.

In turn the cation component and the Lewis acid are used together in a (v/v) ratio to nitrile component of from 0.1 to 50, preferably 0.15 to 20. Of course, the preferred concentration of the combination of organic cation and Lewis acid in the nitrile component depends upon the temperature of operation and other factors, and can be accordingly adjusted.

Suitable cathodes which can be used in the present invention comprise halogen electrodes, such as $Cl_2$, $Br_2$ or $I_2$ electrodes, or cathodes made of graphite, platinum, noble metal oxides (e.g., ruthenium oxide or rhodium oxide), iron sulfides on a carbon support, e.g., iron disulfide, intercalation compounds of graphite, transition metal chalcogenides, transition metal halides, transition metal oxyhalides transition metal oxides and sulphides, oxidized (acceptor-doped) conjugated backbone polymers, and carbon monofluoride polymers ($CF_x$).

Suitable intercalation compounds of graphite are described by M. Armand and P. Touzain in *Mater. Sci. and Eng.*, Vol. 31, pages 319-329 (1977) which is hereby incorporated by reference. Such intercalation compounds include transition metal chlorides, bromides, and fluorides which are, e.g., $AlCl_3$, $AlBr_3$, $BF_3$, $TiF_4$, $CoCl_2$, $FeCl_3$, $FeBr_3$, $HgCl_2$, $SbCl_5$, $MoCl_5$, $WCl_6$, $NiCl_2$, $CrCl_3$, $GaCl_3$.

The cathode materials useful in the present invention may be transition metal halides, such as for example $FeCl_3$, $FeBr_3$, $CrCl_3$ or $CrBr_3$ but also may be $CoBr_3$, $CoCl_3$, and may also be transition metal oxyhalides such as $FeOCl$, $FeOBr$, $CrOCl$, $CrOBr$, or $CoOBr$.

The transition metal chalcogenides suitable as cathode materials useful in this invention and which can contain inserted alkali metals include the transition metal dichalcogenides such as $TiS_2$ and, among others, those listed on page 392 of "Lithium Batteries" edited by J. P. Gabano (Academic Press, 1983) and in K. M.

Abraham, Solid State Ionics, vol. 7 pp. 191–212 (1982) (both incorporated herein by reference).

Conjugated backbone polymers suitable as cathodes in the present invention are those polymers which are capable of being oxidized (acceptor-doped). In their most heavily oxidized state such polymer cathode materials range in voltage from about 3.0V to about 4.6V vs Li/Li+ (for measurements made in various typical organic electrolytes). In ascending order of approximate voltage vs Li/Li+, examples of such polymers useful as cathode materials include oxidized polypyrrole (PP), polyacetylene (PA), polyaniline, polyazulene (PAZ), polythiophene (PT), poly(phenylene vinylene) (PPV), polyacenediyls (e.g. polynaphthalenediyl (PN)), polyacenes, poly(p-phenylene) (PPP), polythianthrene (PTA), poly(phenothiazine) (PPT), poly(phenylene sulfide) (PPS), and poly(phenylene oxide) (PPO).

Also included are substituted versions of the above, e.g., poly(3-methylthiophene) or copolymers of the above, and other polymers having conjugation along at least one backbone thereof and rendered conductive by electrochemical doping with either cations, anions or both. The preferred polymers are polyacetylene and poly(p-phenylene).

The conjugated backbone polymers may be in the form of a powder or a free-standing film. The electrode may also contain additives to act as binders such as polypropylene, polytetrafluoroethylene (sold by DuPont as TEFLON ® or poly(ethylene-chlorotrifluoroethylene (solid by Allied as HALAR ®), or to raise the conductivity such as cabon black (solid by Shawinigan Products as Shawinigan Black ®). The configuration of the polymer electrode may be of any desired type, including spirally wound, prismatic, or bipolar prismatic.

Batteries made in accordance with the present invention can be made using configurations and geometries well known in this art. These batteries can thus be high rate primary, secondary, or reserve electrochemical cells. Since primary and reserve cells are not reusable, in these applications the electrode/electrolyte of the present invention is disposable.

In a preferred embodiment of this invention, an aluminum electrode is used in combination with an acidic electrolyte containing 1-methyl-3-ethylimidazolium chloride and aluminum chloride in acetronitrile. An acidic electrolyte refers to molar ratios of aluminum chloride to 1-methyl-3-ethylimidazolium chloride that are greater than unity.

Other features of this invention will become apparent i the course of the following descriptions of exemplary embodiments which are given for illustration of the invention and are not intended to be limiting thereof.

Experiments in aluminum chloride/1-methyl-3-ethylimidazolium chloride electrolytes that do not contain acetonitrile have indicated that reversible aluminum electrolysis can occur but that passive films form on the surface of the aluminum electrode in these electrolytes during electrolysis precluding their use in high rate systems. In the present invention, a nitrile component is used. Electrochemical experiments have shown that the rate of aluminum dissolution is increased by more than an order of magnitude upon the addition of approximately 54 v/v acetonitrile to mixture of 58 m/m aluminum chloride/42 m/m 1-methyl-3-ethylimidazolium chloride. In these systems there was no evidence of electropassivation in the electrolyte containing the nitrile compound.

EXAMPLE 1

(Electrolyte preparation)

A mixture of 58 m/m aluminum chloride and 42 m/m 1-methyl-3-ethylimidazoline chloride (MEIC) was prepared by the slow addition of $AlCl_3$ to MEIC. Both $AlCl_3$ and MEIC are solids at room temperature but form a liquid when combined in this ratio. MEIC and $AlCl_3$ were synthesized and purified according to Wilkes (Inorg. Chem., 21, 1263, 1982). Acetonitrile (HPLC grade) was further purified by refluxing over $P_2O_5$. The working electrolyte was prepared by adding 54 v/v acetonitrile to the MEIC/$AlCl_3$ mixture. The electrolyte is stirred at room temperature until it is homogeneous.

EXAMPLE 2

A strong interaction between acidic ($AlCl_3$-rich) 1-methyl-3-ethyl imidazoline chloride (MEIC)-/aluminum chloride ($AlCl_3$) mixtures and acetonitrile has been found. No such interaction has been found to occur in basic binary melts.

Preparation and purification of the MEIC was performed as previously reported. J. S. Wilkes, J. A. Levisky, R. A. Wilson, and C. L. Hussey, Inorg. Chem., 21, 1263–1264, (1982). The acetonitrile was dried by refluxing over calcium hydride as a drying agent. All experiments were conducted inside a glove box, with a moisture content below 1 ppm, and an oxygen content below 10 ppm.

Aluminum dissolution studies were conducted in acidic ($AlCl_3$-rich) mixtures, i.e., those melts where chemical reactions between the heptachloroaluminate ion and acetonitrile have been found to occur. Zinc dissolution studies were conducted in basic melts. Aluminum dissolution experiments utilized high purity aluminum working and counter electrodes, while zinc dissolution studies were performed using high purity zinc working and counter electrodes, all of which were fabricated in-house. The working electrodes were rotating cylinders. Prior to use, the acidic melts were further purified by electrolysis between two high purity aluminum electrodes at a current density of approximately 1 $mA/cm^2$.

Rotating cylinder electrodes were chosen for these studies due to their uniform current distributions and mass transfer correlations that are relatively insensitive to shape changes that can be due to dissolution or deposition. In all cases rotation rates were used that assured turbulent flow.

FIG. 1A illustrates aluminum anodic behavior in an acidic melt (mole fraction $AlCl_3=0.58$). Experiments were performed at a 2 mV/sec scan rate and 1000 RPM. Passivation of the electrode was shown by a current peak at a potential of approximately 650 millivolts (with respect to an aluminum-plated platinum reference electrode immersed in an $NAlCl3=0.505$ melt) and has been reported previously. R. Moy, L. R. Simonsen, and F. M. Donahue Abstract No. 98, pp. 138–139. The Electrochemical Society Extended Abstracts, Vo. 86-2, San Diego, Calif. , October 19–24, 1986.

Figure 1B:
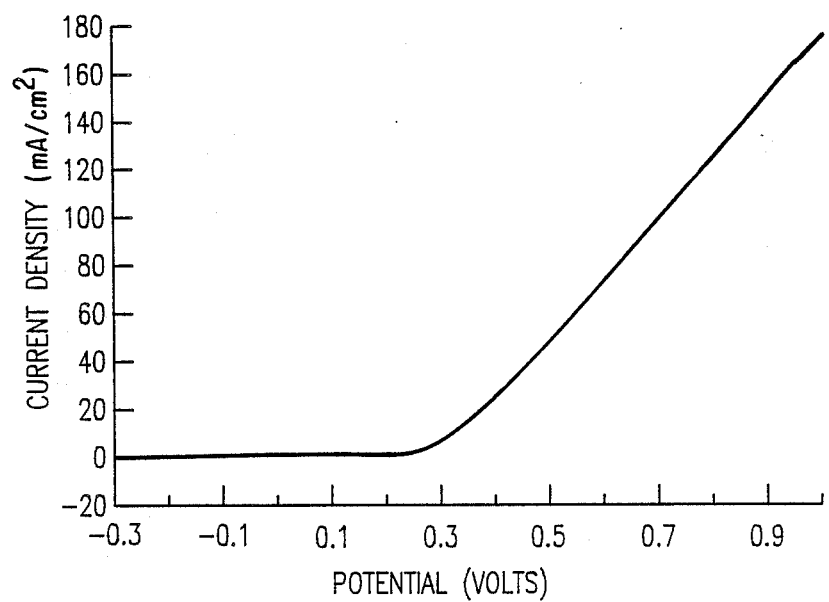
FIG. 1B illustrates aluminum anodic behavior in an electrolyte containing aluminum trichloride/1-methyl-3-ethylimidazolium chloride/acetonitrile.

Addition of acetonitrile to an identical $N=0.58$ melt resulted in a noticeable temperature rise of the mixture and in a change of the electrode rest potential to a more negative (cathodic) value. FIG. 1B is an anodic scan of a 54 v/o mixture of acetonitrile and an $N=0.58$ melt, again at a 2 mV/sec scan rate and 1000 RPM. Current density increased by a factor of ten, and no passivation was observed. Although these experiments were performed under dynamic conditions they appeared to be steady state (note the forward and reverse scans were superimposed). It was not possible to deposit aluminum metal from this mixture although aluminum deposition from the neat melt has been observed previously. J. S. Wilkes and J. J. Auborn. Abstract No. 242, p. 381. The Electrochemical Society Extended Abstracts, Vo. 83–2, Washington, D.C. Oct. 9–14, 1983.

The two components were completely miscible to 50 w/o acetonitrile (highest concentration studied). The rest potential of zinc electrodes was changed by only a few millivolts over this composition region. FIG. 2 is a comparison of anodic scans (1 mV/sec scan rate, 2000 RPM) of an N=0.40 melt (A), and a 50 w/o mixture of acetonitrile and N=0.40 melt (B). The solution containing acetonitrile has increased the zinc dissolution rate by over an order of magnitude.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A battery comprising an anode, a cathode, and an electrolyte, wherein:
   the anode comprises aluminum, zinc, magnesium, calcium, sodium, potassium, gallium, antimony, lead, or an alloy thereof;
   the electrolyte comprises an acidic mixture of a cation component, a Lewis acid and a nitrile component; wherein
   (1) the cation component is LiCl, NaCl, KCl or an organic cation which is a 1,3-dialkylimidazolium cation, a halide derivative of a 1,3-dialkylimidazolium cation, a N-alkyl pyridinium cation, an alkyl derivative of a N-alkyl pyridinium cation, a tetraalkyl ammonium cation, a halide derivative of a tetraalkyl ammonium cation, or a mixture thereof; and
   (2) the nitrile component is an aliphatic or unsaturated organic compound containing from 1 to 6 carbon atoms and being substituted by at least one —CN substituent.

2. The battery of claim 1, wherein the Lewis acid comprises aluminum trichloride, aluminum tribromide, aluminum triiodide, magnesium dichloride, calcium dichloride, a mixed halide of these, or a mixture thereof.

3. The battery of claim 1, wherein the nitrile component is acetonitrile, propionitrile, butyronitrile, benzonitrile or a mixture of these.

4. The battery of claim 1, wherein the said electrolyte contains a molar ratio of Lewis acid to cation component which is greater than one and up to 50.

5. The battery of claim 1, wherein the said organic cation is a 1,3-dialkylimidazolium cation in which each alkyl group independent contains from 1 to 6 carbon atoms.

6. The battery of claim 1, wherein the said organic cation is a N-alkyl pyridinium cation in which the alkyl group contains from 1 to 6 carbon atoms.

7. The battery of claim 1, wherein the said organic cation ion is a tetraalkyl ammonium cation in which each alkyl group independently contains from 1 to 6 carbon atoms.

8. The battery of claim 1, wherein the said organic cation is a 1,3-dialkyl imidazolium cation substituted with from 1 to 6 halogen atoms and wherein each alkyl group independently contains from 1 to 6 carbon atoms.

9. The battery of claim 1, wherein the said organic cation is a $N-(C_{1-6})$alkyl pyridinium cation further substituted by one to six $C_{1-4}$ alkyl substituents.

10. The battery of claim 1, wherein the said organic cation is a tetraalkyl ammonium cation substituted with from 1 to 6 halide atoms and in which each alkyl group independently contains from 1 to 6 carbon atoms.

11. The battery of claim 4, wherein the said molar ratio is up to 10.

12. The battery of claim 1, wherein the said cation component and the said Lewis acid are used together in a (v/v) ratio to nitrile component of 0.1 to 50.

13. The battery of claim 12, wherein the said ratio is from 0.15 to 20.

14. The battery of claim 1, wherein the said organic cation comprises 1-methyl-3-ethyl imidazolium chloride and the said anode comprises aluminum.

15. The battery of claim 1, wherein the said Lewis acid comprises aluminum chloride.

16. The battery of claim 1, wherein the said nitrile compound comprises acetonitrile.

* * * * *